(12) United States Patent
Gupta et al.

(10) Patent No.: US 7,302,490 B1
(45) Date of Patent: Nov. 27, 2007

(54) MEDIA FILE FORMAT TO SUPPORT SWITCHING BETWEEN MULTIPLE TIMELINE-ALTERED MEDIA STREAMS

(75) Inventors: Anoop Gupta, Woodinville, WA (US); Nosakhare D. Omoigui, Sammamish, WA (US); Li-Wei He, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/564,297

(22) Filed: May 3, 2000

(51) Int. Cl.
*G06F 15/16* (2006.01)
*H04N 7/08* (2006.01)

(52) U.S. Cl. .................. 709/231; 709/246; 726/32

(58) Field of Classification Search .............. 709/231, 709/236, 219; 707/1, 512; 725/86, 87, 88, 725/90, 93, 94; 715/720; 386/68
See application file for complete search history.

(56) References Cited

U.S. PATENT DOCUMENTS

| | | |
|---|---|---|
| 4,649,499 A | 3/1987 | Sutton et al. |
| 4,931,950 A | 6/1990 | Isle et al. .................. 364/513 |
| 5,050,161 A | 9/1991 | Golestani .................. 370/60 |
| 5,119,474 A | 6/1992 | Beitel et al. ............... 395/154 |
| 5,175,769 A | 12/1992 | Hejna et al. |
| 5,274,758 A | 12/1993 | Beitel et al. ............... 395/154 |
| 5,309,562 A | 5/1994 | Li ............................. 395/200 |
| 5,313,454 A | 5/1994 | Bustini et al. ............. 370/13 |
| 5,341,474 A | 8/1994 | Gelman et al. ............ 395/200 |
| 5,414,455 A | 5/1995 | Hooper et al. ............. 348/7 |
| 5,420,801 A | 5/1995 | Dockter et al. |
| 5,434,848 A | 7/1995 | Chimento, Jr. et al. .... 370/17 |
| 5,455,910 A | 10/1995 | Johnson et al. ............ 395/650 |
| 5,479,303 A * | 12/1995 | Suzuki et al. .............. 360/72.2 |
| 5,481,542 A | 1/1996 | Logston et al. ............ 370/94.2 |
| 5,490,252 A | 2/1996 | Macera et al. ............. 395/200.01 |
| 5,504,744 A | 4/1996 | Adams et al. ............. 370/60.1 |
| 5,519,701 A | 5/1996 | Colmant et al. ........... 370/60.1 |
| 5,521,630 A | 5/1996 | Chen et al. ................ 348/7 |
| 5,524,193 A | 6/1996 | Covington et al. |
| 5,533,021 A | 7/1996 | Branstad et al. .......... 370/60.1 |

(Continued)

FOREIGN PATENT DOCUMENTS

EP 0605115 7/1994

(Continued)

OTHER PUBLICATIONS

John Shelton et al., Media Server Content Preparation Specification and Default Parameters; Hewlett Packard, May 4, 1995, p. 1-22.*

(Continued)

*Primary Examiner*—Ayaz Sheikh
*Assistant Examiner*—Christian LaForgia
(74) *Attorney, Agent, or Firm*—Lee & Hayes, PLLC (57) ABSTRACT

In a networked client/server system, media content is streamed from a server computer to a client computer. A media file format is used to store data for multiple timeline-altered streams that provides support for switching between the different timeline-altered streams during their presentation. According to one embodiment, a time code stream includes multiple data objects mapping corresponding timeline-altered stream data units to primary stream presentation times, and an index table mapping primary stream presentation times to timeline-altered stream byte offsets.

8 Claims, 8 Drawing Sheets

U.S. PATENT DOCUMENTS

| | | | | |
|---|---|---|---|---|
| 5,537,408 | A | 7/1996 | Branstad et al. | 370/79 |
| 5,541,955 | A | 7/1996 | Jacobsmeyer | 375/222 |
| 5,559,942 | A | 9/1996 | Gough et al. | 395/155 |
| 5,566,175 | A | 10/1996 | Davis | 370/84 |
| 5,572,643 | A | 11/1996 | Judson | |
| 5,574,724 | A | 11/1996 | Bales et al. | 370/68.1 |
| 5,614,940 | A | 3/1997 | Cobbley et al. | 348/7 |
| 5,617,423 | A | 4/1997 | Li et al. | 370/426 |
| 5,623,690 | A | 4/1997 | Palmer et al. | 395/806 |
| 5,625,405 | A | 4/1997 | DuLac et al. | 348/7 |
| 5,640,320 | A | 6/1997 | Jackson et al. | 364/192 |
| 5,642,497 | A | 6/1997 | Crary et al. | |
| 5,664,227 | A | 9/1997 | Mauldin et al. | 395/778 |
| 5,692,213 | A | 11/1997 | Goldberg et al. | 395/806 |
| 5,692,313 | A | 12/1997 | Ikeda et al. | |
| 5,717,691 | A | 2/1998 | Dighe et al. | 370/401 |
| 5,717,869 | A | 2/1998 | Moran et al. | 395/339 |
| 5,719,786 | A | 2/1998 | Nelson et al. | 364/514 |
| 5,721,829 | A | 2/1998 | Dunn et al. | 395/200.49 |
| 5,742,347 | A | 4/1998 | Kandlur et al. | 348/426 |
| 5,768,533 | A | 6/1998 | Ran | 395/200.77 |
| 5,786,814 | A | 7/1998 | Moran et al. | 345/328 |
| 5,793,980 | A | 8/1998 | Glaser et al. | |
| 5,794,210 | A | 8/1998 | Goldhaber et al. | 705/14 |
| 5,794,249 | A | 8/1998 | Orsolini et al. | 707/104 |
| 5,799,292 | A | 8/1998 | Hekmatpour | 706/11 |
| 5,801,685 | A | 9/1998 | Miller et al. | 345/302 |
| 5,808,662 | A | 9/1998 | Kinney et al. | 348/15 |
| 5,818,510 | A | 10/1998 | Cobbley et al. | 348/7 |
| 5,822,537 | A | 10/1998 | Katseff et al. | 395/200.61 |
| 5,828,848 | A | 10/1998 | MacCormack et al. | 395/200.77 |
| 5,832,437 | A | 11/1998 | Nishiguchi et al. | |
| 5,835,495 | A | 11/1998 | Ferriere | 370/465 |
| 5,835,667 | A | 11/1998 | Wactlar et al. | 386/96 |
| 5,838,906 | A | 11/1998 | Doyle et al. | 395/200.32 |
| 5,842,172 | A | 11/1998 | Wilson | |
| 5,852,705 | A | 12/1998 | Hanko et al. | |
| 5,859,641 | A | 1/1999 | Cave | 345/348 |
| 5,864,682 | A | 1/1999 | Porter et al. | 395/200.77 |
| 5,870,755 | A | 2/1999 | Stevens et al. | 707/104 |
| 5,873,735 | A | 2/1999 | Yamada et al. | 434/316 |
| 5,880,788 | A | 3/1999 | Bregler | |
| 5,892,506 | A | 4/1999 | Hermanson | 345/302 |
| 5,893,053 | A | 4/1999 | Trueblood | |
| 5,893,062 | A | 4/1999 | Bhadkamkar et al. | |
| 5,903,673 | A | 5/1999 | Wang et al. | 382/236 |
| 5,918,002 | A | 6/1999 | Klemets et al. | 395/182.16 |
| 5,930,787 | A | 7/1999 | Minakuchi et al. | 707/4 |
| 5,941,936 | A | 8/1999 | Taylor | |
| 5,953,506 | A * | 9/1999 | Kalra et al. | 709/231 |
| 5,956,716 | A | 9/1999 | Kenner et al. | 707/10 |
| 5,995,941 | A | 11/1999 | Maquire et al. | 705/10 |
| 5,999,979 | A | 12/1999 | Vellanki et al. | 709/232 |
| 6,006,241 | A | 12/1999 | Purnaveja et al. | 707/512 |
| 6,014,706 | A | 1/2000 | Cannon et al. | 709/231 |
| 6,023,731 | A | 2/2000 | Chawla | 709/231 |
| 6,032,130 | A | 2/2000 | Alloul et al. | 705/27 |
| 6,035,341 | A | 3/2000 | Nunally et al. | 709/253 |
| 6,041,345 | A | 3/2000 | Levi et al. | 709/217 |
| 6,049,823 | A | 4/2000 | Hwang | 709/218 |
| 6,064,794 | A * | 5/2000 | McLaren et al. | 386/68 |
| 6,065,050 | A * | 5/2000 | DeMoney | 709/219 |
| 6,118,450 | A | 9/2000 | Proehl et al. | 345/349 |
| 6,118,817 | A | 9/2000 | Wang | 375/240 |
| 6,128,653 | A | 10/2000 | Del Val et al. | 709/219 |
| 6,133,920 | A | 10/2000 | DeCarmo et al. | 345/354 |
| 6,144,375 | A | 11/2000 | Jain et al. | 345/302 |
| 6,148,304 | A | 11/2000 | De Vries et al. | 707/104 |
| 6,154,771 | A | 11/2000 | Rangan et al. | 709/217 |
| 6,166,314 | A | 12/2000 | Weinstock et al. | 84/483.1 |
| 6,169,843 | B1 | 1/2001 | Lenihan et al. | |
| 6,173,317 | B1 | 1/2001 | Chaddha et al. | 709/219 |
| 6,204,840 | B1 | 3/2001 | Petelycky et al. | 345/302 |
| 6,215,910 | B1 | 4/2001 | Chaddha | 382/253 |
| 6,230,172 | B1 * | 5/2001 | Purnaveja et al. | 707/512 |
| 6,233,389 | B1 | 5/2001 | Barton et al. | 386/46 |
| 6,332,147 | B1 | 12/2001 | Moran et al. | |
| 6,452,615 | B1 | 12/2001 | deVries et al. | |
| 6,345,293 | B1 | 2/2002 | Chaddha | |
| 6,392,651 | B1 | 5/2002 | Stradley | |
| 6,415,326 | B1 * | 7/2002 | Gupta et al. | 709/231 |
| 6,424,792 | B1 | 7/2002 | Tsukagoshi et al. | |
| 6,442,538 | B1 * | 8/2002 | Nojima | 707/1 |
| 6,453,336 | B1 | 9/2002 | Beyda et al. | |
| 6,484,156 | B1 * | 11/2002 | Gupta et al. | 707/1 |
| 6,512,552 | B1 * | 1/2003 | Subramanian | 348/564 |
| 6,675,174 | B1 * | 1/2004 | Bolle et al. | 707/104.1 |
| 6,724,401 | B1 | 4/2004 | Hennum et al. | |
| 6,907,570 | B2 * | 6/2005 | Amir et al. | 715/720 |
| 6,965,724 | B1 * | 11/2005 | Boccon-Gibod et al. | 386/68 |
| 2002/0038374 | A1 * | 3/2002 | Gupta et al. | 709/231 |
| 2002/0129374 | A1 * | 9/2002 | Freeman et al. | 725/91 |
| 2002/0133247 | A1 * | 9/2002 | Smith et al. | 700/94 |
| 2003/0196164 | A1 * | 10/2003 | Gupta et al. | 715/500.1 |

FOREIGN PATENT DOCUMENTS

| | | |
|---|---|---|
| EP | 0653884 | 5/1995 |
| EP | 0669587 A2 | 8/1995 |
| EP | 06768989 | 10/1995 |
| EP | 0746158 | 12/1996 |
| EP | 0812112 A2 | 12/1997 |
| WO | WO 94/01964 | 1/1994 |
| WO | WO98/37698 | 8/1998 |

OTHER PUBLICATIONS

H.J. Chen et al., "A Scalable Video-on-Demand Service for the Provision of VCR-Like Functions," IEEE, May 15, 1995, pp. 65-72.

Lynda Hardman et al., "Multimedia authoring paradigms," *Authoring and Application of Hypermedia-Based User-Interfaces, IEE Colloquium*, The Institution of Electrical Engineers 1995, pp. 8/1-8/3.

John David N. Dionisio and Alfonso F. Cardenas, "A Unified Data Model for Representing Multimedia, Timeline, and Simulation Data," *IEEE Transactions on Knowledge and Data Engineering*, vol. 10, No. 5, Sep./Oct. 1998, pp. 746-767.

Arons, Barry, "SpeechSkimmer: A System for Interactively Skimming Recorded Speech", ACM Transactions on Computer-Human, vol. 4, No. 1, pp. 3-38.

Internet Reference "An Annotated Bibliography of Interactive Speech User Interfaces by Barry Arons" HTTP://barons.www.media.mit.edu/people/barons/AronsAnnotatedBibliography.html, date unknown.

"GSM Full Rate Speech Transcoding," ETSI/PT 12, Feb. 1992, pp. 1-93.

P. Vary et al., "Speech Codec for the European Mobile Radio System," 1998 IEEE, pp. 227-230.

Informedia—Internet Reference, http://www.informedia.cs.cmu.edu, date unknown.

Microsoft Corporation and RealNetworks, Inc., "Advanced Streaming Format (ASF) Specification", Feb. 26, 1998, Public Specification Version 1.0, 55 pages.

\* cited by examiner

MEDIA FILE FORMAT TO SUPPORT SWITCHING BETWEEN MULTIPLE TIMELINE-ALTERED MEDIA STREAMS

RELATED APPLICATIONS

This application is a continuation-in-part of U.S. patent application Ser. No. 09/153,664, filed Sep. 15, 1998, now U.S. Pat. No. 6,622,171. This application is also a continuation-in-part of U.S. patent application Ser. No. 09/396,984, filed Sep. 15, 1999, which claims the benefit of U.S. Provisional Application No. 60/100,452, filed Sep. 15, 1998.

TECHNICAL FIELD

This invention relates to networked client/server systems and to methods of streaming and rendering media content in such systems. More particularly, the invention relates to a media file format to support switching between multiple timeline-altered media streams.

BACKGROUND OF THE INVENTION

Multimedia streaming—the continuous delivery of synchronized media data like video, audio, text, and animation—is a critical link in the digital multimedia revolution. Today, streamed media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file: text can change and move, and animation and digital effects happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed basis, rather than being pre-delivered in its entirety before playback. Thus, the client computer renders streaming data as it is received from a network server, rather than waiting for an entire "file" to be delivered.

The widespread availability of streaming multimedia enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

A U.S. patent application entitled "Multimedia Timeline Modification in Networked Client/Server Systems," filed Sep. 15, 1998, Ser. No. 09/153,664, by inventors Anoop Gupta and Nosakhare D. Omoigui, describes a system that allows a user to vary the playback speed of streaming multimedia content using time-scale modification technology. It was noted that both linear and non-linear timeline alteration techniques might be used.

When using linear techniques, time modification is applied consistently in times and across all individual streams of a composite media stream. With non-linear techniques, on the other hand, some segments of an individual or composite stream might be more highly expanded or compressed (in time) than other segments. This presents problems in switching and synchronizing between different versions of streams that have been non-linearly altered by different amounts or through the use of different non-linear techniques.

The invention described below addresses these problems, providing a media file format that supports switching between different timeline-altered streams.

SUMMARY OF THE INVENTION

In a networked client/server system, media content is streamed from a server computer to a client computer. Multiple timeline-altered streams for the media content are stored using a media file format that provides support for switching between the different timeline-altered streams during their presentation.

According to one aspect, the server stores a primary stream (whose timeline has not been altered) and a timeline-altered stream, each of which is made up of multiple data units in which the time is linear. A time code stream is also stored for the timeline-altered stream. The time code stream includes multiple data objects, each object corresponding to a data unit of the timeline-altered stream. Each of the multiple data objects includes data identifying a presentation time, of the primary stream, corresponding to the data unit of the timeline-altered stream.

According to another aspect, the server stores a primary stream (whose timeline has not been altered) and multiple timeline-altered streams. The server also stores an index table that includes, for each of the timeline-altered streams, multiple entries corresponding to the presentation times of the primary stream. Each index table entry includes a mapping of the corresponding primary stream presentation time to a byte offset of the associated timeline-altered stream.

According to another aspect, a user can switch between different timeline-altered streams. Upon receiving a user request to switch to a particular timeline-altered stream (the target stream), the client computer accesses a time code stream data object corresponding to the current data unit being presented. The time code stream data object identifies a primary stream presentation time corresponding to the data unit. The client then uses the primary stream presentation time to index into a table of mappings to byte offsets. The table provides a mapping of the primary stream presentation time to a corresponding byte offset of the target stream.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

General Network Structure

Figure 1:
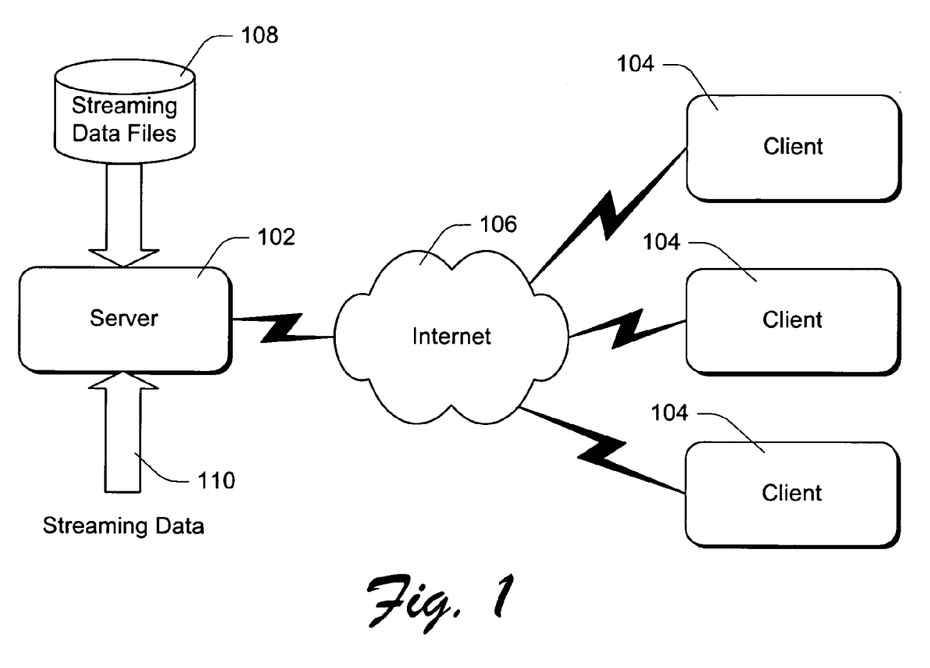
FIG. 1 shows a client/server network system and environment in accordance with certain embodiments of the invention.

FIG. 1 shows a client/server network system and environment in accordance with certain embodiments of the invention. Generally, the system includes a network server computer 102 and a plurality of network client computers 104. The computers communicate with each other over a data communications network. The communications network in FIG. 1 comprises a public network 106 such as the Internet. The data communications network might also include local-area networks and/or private wide-area networks.

Server computer 102 has access to streaming media content in the form of different composite media streams. Some composite media streams might be stored as files in a database or other file storage system 108. Other composite media streams 110 might be supplied to the server on a "live" basis from other data source components through dedicated communications channels or through the Internet itself.

Streaming Media

In this discussion, the term "composite media stream" describes synchronized streaming data that represents a segment of multimedia content. The composite media stream has a timeline that establishes the speed at which the content is rendered. The composite media stream can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format used, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, gaming consoles, multiprocessor systems, microprocessor-based or programmable consumer electronics, network PCs, minicomputers, mainframe computers, and the like. In a distributed computer environment, program modules may be located in both local and remote memory storage devices.

Figure 2:
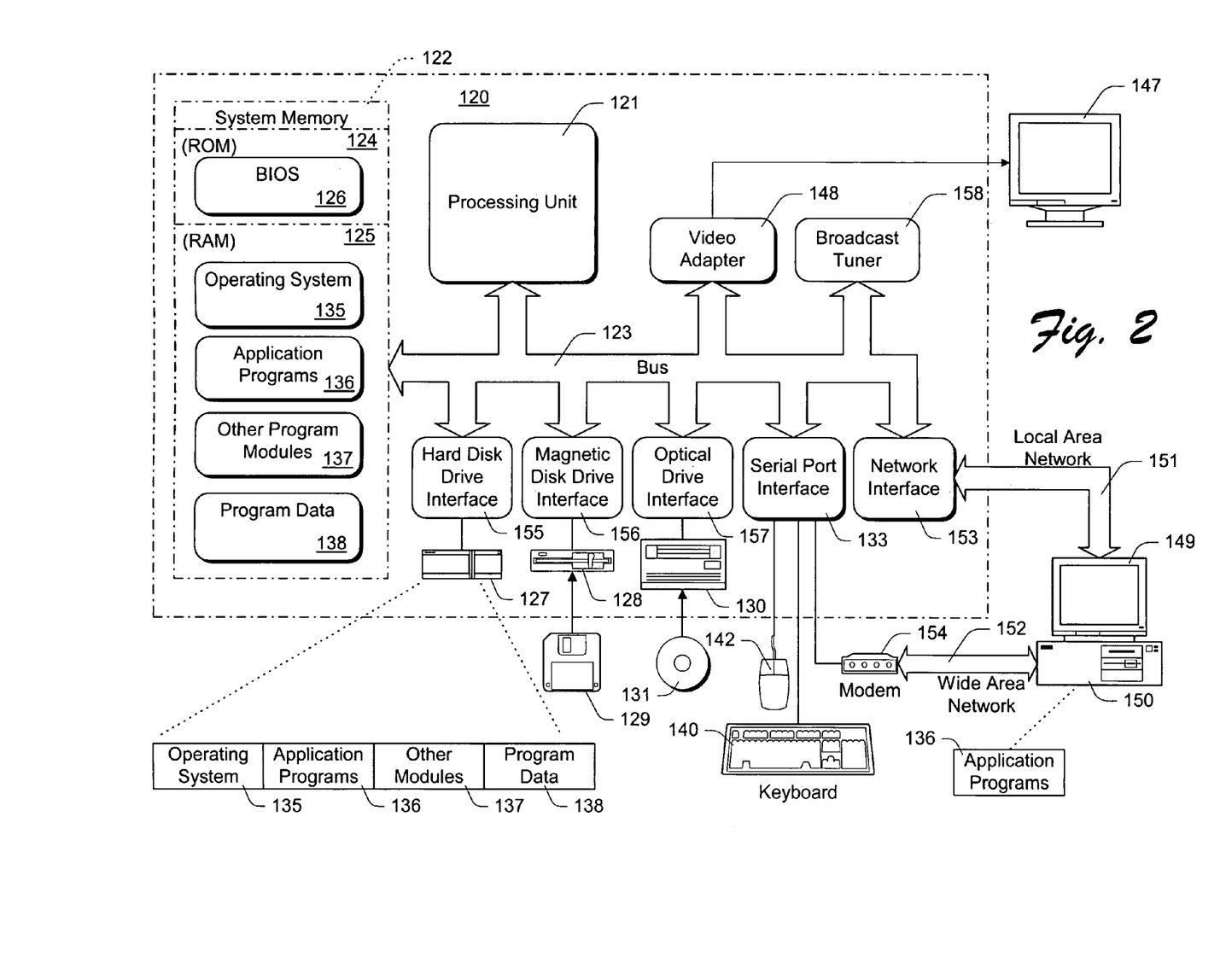
FIG. 2 shows a general example of a computer that can be used as a client or server in accordance with certain embodiments of the invention.

FIG. 2 shows a general example of a computer 120 that can be used as a client or server in accordance with certain embodiments of the invention. Computer 120 is shown as an example of a computer that can perform the functions of either server computer 102 or a client computer 104 of FIG. 1.

Computer 120 includes one or more processors or processing units 121, a system memory 122, and a bus 123 that couples various system components including the system memory to processors 121. The bus 123 represents one or more of any of several types of bus structures, including a memory bus or memory controller, a peripheral bus, an accelerated graphics port, and a processor or local bus using any of a variety of bus architectures. The system memory includes read only memory (ROM) 124 and random access memory (RAM) 125. A basic input/output system 126 (BIOS), containing the basic routines that help to transfer information between elements within server computer 120, such as during start-up, is stored in ROM 124.

Computer 120 further includes a hard disk drive 127 for reading from and writing to a hard disk, not shown, connected to bus 123 via a hard disk drive interface 155 (e.g., a SCSI, ATA, or other type of interface); a magnetic disk drive 1128 for reading from and writing to a removable magnetic disk 129, connected to bus 123 via a magnetic disk drive interface 156; and an optical disk drive 130 for reading from or writing to a removable optical disk 131 such as a CD ROM, DVD, or other optical media, connected to bus 123 via an optical drive interface 157. The drives and their associated computer-readable media provide nonvolatile storage of computer readable instructions, data structures, program modules and other data for computer 120. Although the exemplary environment described herein employs a hard disk, a removable magnetic disk 129 and a removable optical disk 131, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 129 optical disk 131, ROM 124, or RAM 125, including an operating system 135, one or more application programs 136, other program modules 137, and program data 138. A user may enter commands and information into computer 120 through input devices such as keyboard 140 and pointing device 142. Other input devices (not shown) may include a microphone, joystick, game pad, satellite dish, scanner, or the like. These and other input devices are connected to the processing unit 121 through an interface 146 that is coupled to the system bus. A monitor 147 or other type of display device is also connected to the system bus 123 via an interface, such as a video adapter 148. In addition to the monitor, personal computers typically include other peripheral output devices (not shown) such as speakers and printers.

Computer 120 operates in a networked environment using logical connections to one or more remote computers, such as a remote computer 149. The remote computer 149 may be another personal computer, a server, a router, a network PC, a peer device or other common network node, and typically includes many or all of the elements described above relative to computer 120, although only a memory storage device 150 has been illustrated in FIG. 2. The logical connections depicted in FIG. 2 include a local area network (LAN) 151 and a wide area network (WAN) 152. Such networking environments are commonplace in offices, enterprise-wide computer networks, intranets, and the Internet. In the described embodiment of the invention, remote computer 149 executes an Internet Web browser program such as the Microsoft® Internet Explorer Web browser manufactured and distributed by Microsoft Corporation of Redmond, Wash.

When used in a LAN networking environment, computer 120 is connected to the local network 151 through a network interface or adapter 153. When used in a WAN networking environment, computer 120 typically includes a modem 154 or other means for establishing communications over the wide area network 152, such as the Internet. The modem 154, which may be internal or external, is connected to the system bus 123 via an interface (e.g., serial port interface 133). In a networked environment, program modules depicted relative to the personal computer 120, or portions thereof, may be stored in the remote memory storage device. It will be appreciated that the network connections shown are exemplary and other means of establishing a communications link between the computers may be used.

Computer 120 also optionally includes one or more broadcast tuners 158. Broadcast tuner 158 receives broadcast signals either directly (e.g., analog or digital cable transmissions fed directly into tuner 158) or via a reception device (e.g., an antenna, satellite dish, etc.).

Generally, the data processors of computer 120 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the acts described below in conjunction with a microprocessor or other data processor. The invention also includes the computer itself when programmed according to the methods and techniques described below. Furthermore, certain sub-components of the computer may be programmed to perform the functions and acts described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Multimedia Time-Scale Modification

As shown in FIG. 1, a network system in accordance with the invention includes a network server 102 from which a plurality of composite media streams are available. In the described embodiment of the invention, the media streams are stored as files on some type of data storage device accessible by the server.

The system also includes network clients 104. Generally, network clients 104 are responsive to user input to select or request identified composite media streams. In response to a request for a composite media stream, server 102 streams the requested composite media stream to the requesting network client 104 in accordance with some known format, such as ASF. The client 104 renders the data streams to produce the multimedia content.

In accordance with the invention, a network client also accepts a speed designation or playback speed from a human user. The speed designation might be a speed factor relative to the original or default playback speed of the selected multimedia stream. For example, a speed factor of 1.2 indicates that the composite media stream is to be rendered at 1.2 times its original or default speed, thereby achieving time compression. A speed factor of 0.8 indicates that the composite media stream is to be rendered at 0.8 times its original or default speed, thereby achieving time expansion.

In addition, or alternatively, the speed designation might indicate one of a plurality of different types or levels of non-linear timeline compression. As an example, such levels might include a type of non-linear timeline compression that removes audio pauses from a spoken presentation. Another level, perhaps referred to as "summary" compression, might retain only short periods of a presentation that are marked by high energy levels in either audio or video portions of the content.

In response to the speed or playback designation from the user, the client requests a composite media stream from the server, indicating the desired type, level, or degree of timeline alteration. A plurality of composite streams are available at the server, corresponding to different possible timeline alterations. In response to the request from the client, the server begins streaming a composite stream that has already had its timeline altered in accordance with the speed designation.

With some types of media, such as video streams, timeline alteration involves either omitting selected frames or modifying the presentation times of the individual data units or video frames. In other cases, such as with audio streams, the time modification is more difficult—simply changing the presentation times would alter the pitch of the original audio and make it unintelligible. Accordingly, some type of audio processing technique is used to time-compress or time-expand audio streams, while maintaining the original pitch of the audio—thereby maintaining the intelligibility of the audio.

There are various known methods of audio time modification, commonly referred to as "time-scale-modification," most of which concentrate on removing redundant information from the speech signal. In a method referred to as sampling, short segments are dropped from the speech signal at regular intervals. Cross fading or smoothing between adjacent segments improves the resulting sound quality.

Another method, referred to as synchronized overlap add method (SOLA or OLA), consists of shifting the beginning of a new speech segment over the end of the preceding segment to find the point of highest cross-correlation (i.e., maximum similarity). The overlapping frames are averaged, or smoothed together, as in the sampling method.

Sampling with dichotic presentation is a variant of the sampling method that takes advantage of the auditory system's ability to integrate information from both ears. In improves on the sampling method by playing the standard sampled signal to one ear and the "discarded" material to the other ear. Intelligibility and compression increase under this dichotic presentation condition when compared with standard presentation techniques.

More information regarding audio time modification is given in an article that appeared in the March, 1997, issue of "ACM Transactions on Computer-Human Interaction" (Volume 4, Number 1, pages 3-38) (1997). For purposes of this disclosure, it can be assumed that audio time modification involves some combination of changing individual data stream samples, dropping certain samples, and adjusting presentation times of any samples that are actually rendered.

The timeline alteration methods mentioned above are considered "linear" because all portions of the speech signal are compressed or expanded uniformly. That is, timeline alteration is applied consistently in time and across all individual streams of a composite media stream. With non-linear timeline alteration techniques, on the other hand, some segments of an individual or composite stream might be more highly expanded or compressed (in time) than other segments. Furthermore, the respective individual streams of a composite stream might be expanded or compressed by different amounts relative to each other.

One example of a non-linear time-compression method is referred to as pause removal. When using this method, a speech processing algorithm attempts to identify and remove any pauses in a recording. Similar techniques might be used in conjunction with video, by identifying and removing periods of relative inactivity. Non-linear timeline alteration presents special challenges when attempting to synchronize different streams having timelines altered by different techniques.

The need to synchronize between streams can occur when switching between different streams during playback. For example, a user might view the first two minutes of a multimedia stream at a normal or 1.0 playback speed, and then request a "pause removal" type of time compression. The system responds by streaming a new composite media stream, having the requested time compression. However, the user does not want to start over by again viewing the first two minutes of the presentation. Rather, the user wants to resume playback at the same point in the content at which the request to change the playback speed was made. This point is two minutes into the original stream, but is at some time less than two minutes into the time-compressed stream.

Figure 3:
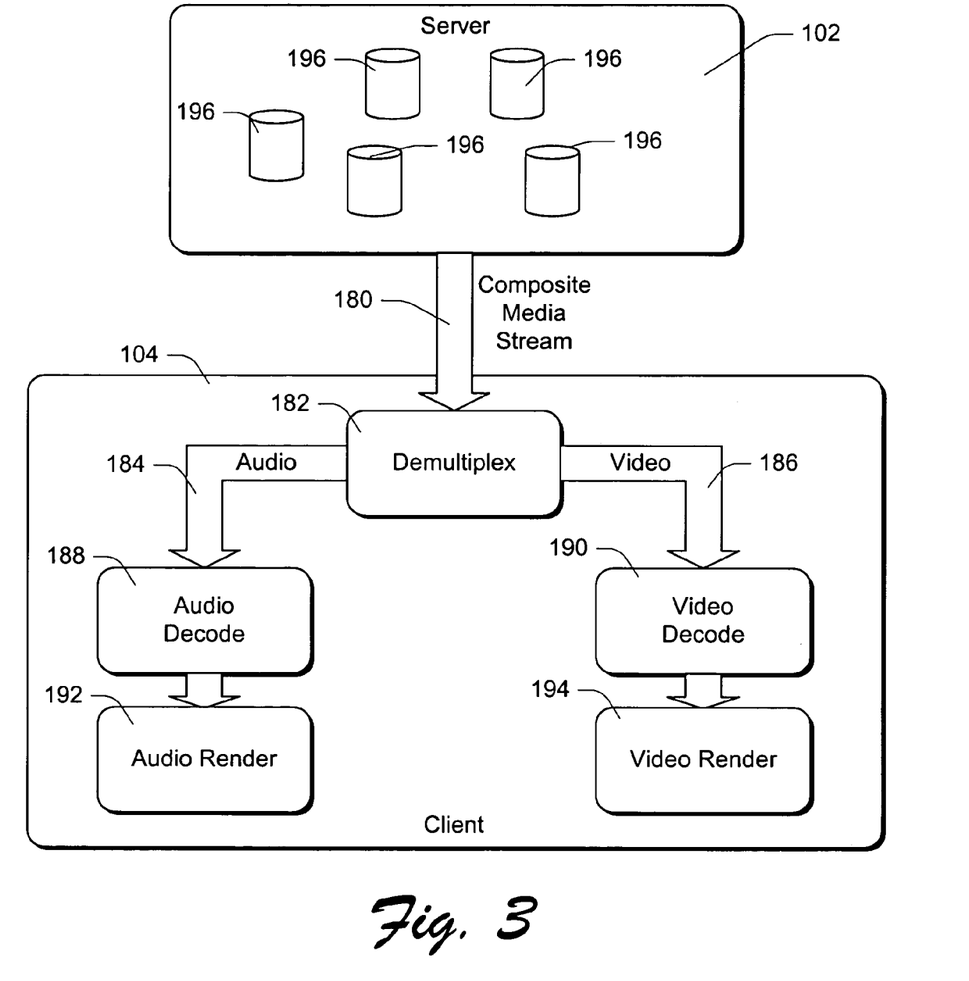
FIG. 3 illustrates the flow of a composite media stream in accordance with certain embodiments of the invention.

FIG. 3 illustrates the flow of a composite media stream in accordance with certain embodiments of the invention. Network server 102 streams a composite media stream 180 to network client 104. The composite media stream 180 has a plurality of individual media streams, as described above. For purposes of discussion, it is assumed in this example that the composite media stream has an audio stream and a video stream. Each media stream has a timeline, and the timelines of the individual streams are synchronized with each other so that the streams can be rendered in combination to produce coordinated multimedia content at the network client 104.

Client computer 104 has a demultiplexer component 182 that receives composite media stream 180 and separates out the individual media streams from the composite format in which the data is streamed (such as ASF). Assuming for purposes of discussion that the composite media streams consist of audio and video streams, this results in an audio media stream 184 and a video media stream 186. The individual media streams are sent to and received by respective decoders 188 and 190 that perform in accordance with the particular data format being employed. For example, the decoders might perform data decompression.

The decoded data streams are then sent to and received by respective renderers 192 and 194. The rendering components 192 and 194 render the streams in accordance with their potentially modified timelines, as the streams continue to be streamed from the network server.

For any particular multimedia segment, the server creates and stores several versions of a composite media stream. A plurality of such composite media streams are shown in FIG. 3, referenced by numeral 196. The illustrated media streams all correspond to the same content. One of the media streams is referred to as a primary or reference version of the media stream. A primary media stream is typically not a stream that has been timeline-altered. In addition to the primary media stream, however, the server stores a number of timeline-altered streams, having timelines that have been altered in accordance with linear and/or non-linear techniques. In response to user's selection of a particular playback speed or time-compression method, the server selects and streams the appropriate one of the stored composite media streams to the client.

There is a known timeline correlation between the data units of the various media streams. The term "timeline correlation" as used herein refers to a correlation in content between two streams that differ in the degree and/or manner in which their timelines have been modified. The timeline correlations for non-linear timeline modification (and alternatively for linear timeline modification as well) are compiled and stored with the composite media streams, and typically are generated as the timeline modification is performed. The stored timeline correlation data is then referenced by the system when it becomes necessary to find content in one stream corresponding to the same content in another stream.

Specifically, server 102 stores an index table of timeline correlations mapping presentation times of the primary media stream to byte offsets of each of the timeline-altered media streams. Server 102 further stores, for each of the timeline-altered media streams, a time code stream mapping presentation times of the timeline-altered media stream to presentation times of the primary media stream.

Figure 4:
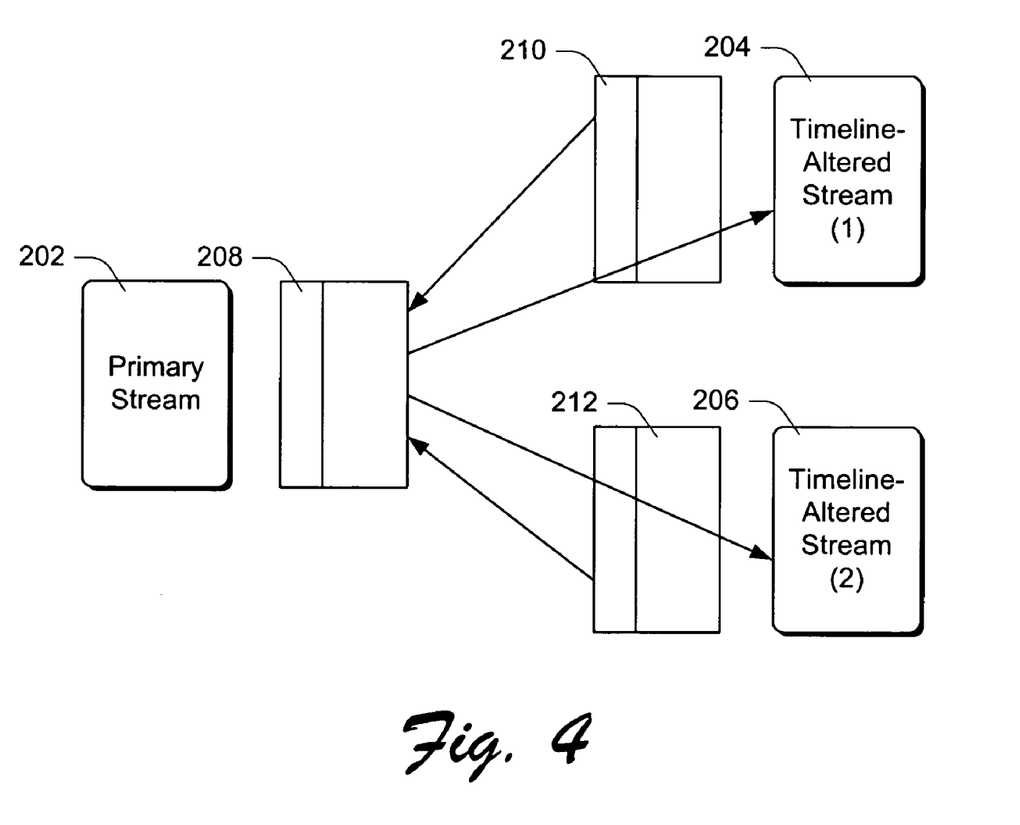
FIG. 4 illustrates an exemplary index table and exemplary time code streams corresponding to timeline-altered streams in accordance with certain embodiments of the invention.

FIG. 4 illustrates this more clearly. Shown in FIG. 4 are a primary media stream 202 and two timeline-altered media streams 204 and 206. Each of the streams 202-206 is a sequence of individual data units, with each of the data units being located at a particular byte offset from some point of reference (e.g., the beginning of an ASF file storing streams 202-206). In this example, the timeline-altered media streams have corresponding timelines that are non-linearly altered relative to the timeline of the primary media stream.

Also shown in FIG. 4 are an index table and time code streams corresponding to the media streams. Index table 208, associated with primary media stream 202, is a cross-reference containing mappings from presentation times of the primary media stream to timeline-correlated offsets of the timeline-altered media streams 204 and 206. Table 208 is indexed by presentation times of the primary media stream. Thus, for any given presentation time of the primary media stream, it is possible to quickly find a corresponding or timeline-correlated offset into either of the two timeline-altered media streams.

In one implementation, the correlated offsets into the timeline-altered streams are based on ranges of samples rather than specific samples. For example, the correlations may be based on 100 millisecond (ms) ranges (referred to as a 100 ms granularity). Thus, a single offset would correspond to each 100 ms time period (e.g., the offset corresponding to the time of 525 ms would be the same as Corresponds to the time of 530 ms). Any of a wide range of granularities can be used, balancing increased accuracy (achieved from lower granularities) against reduced storage space requirements (achieved from higher granularities).

By itself, table 208 is useful when switching from primary media stream 202 to one of the timeline-altered media streams 204 or 206. To transition, for instance, from primary media stream 202 to timeline-altered media stream 204, the current presentation time of primary media stream 202 is noted. This presentation time is used as an index into table 208 to find the corresponding offset into the first media stream. This offset is a byte offset, identifying a number of bytes into the data of timeline-altered stream 204 that corresponds to the presentation time of primary media stream 202. Presentation of the media stream 204 is then initiated at the correlated offset as found in the table.

Time code streams 210 and 212 are associated respectively with first and second timeline-altered media streams 204 and 206, and are used as references to the primary media stream. Each of these time code streams includes objects with data that maps presentation times of its associated media stream to presentation times in primary media stream 202, at some specified fixed or variable granularity.

Index table 208 and time code streams 210 and 212 can be stored and referenced by server 102 of FIG. 1. Alternatively, they can be stored by server 102 and downloaded to client 104 as needed. As a further alternative, the time code streams 210 and 212 can be provided with individual data units of the timeline-altered media streams 204 and 206 respectively. In accordance with this further alternative, each data unit of the timeline-altered media streams 204 and 206 is accompanied by a presentation time at which the data unit is to be rendered, and also by a reference presentation time, wherein the reference presentation time indicates a presentation time in the primary reference stream that corresponds to the presentation time of the data unit in the timeline-altered media stream. This reference presentation time is then used as an index into table 208 associated with primary stream 202.

FIGS. 5-8 illustrate exemplary data structures that can be used to create index table 208 and time code streams 210 and 212 of FIG. 4. These data structures of FIGS. 5-8 are illustrated with reference to ASF. However, these data structures or analogous data structures can be used with various other streaming media formats. In the descriptions of FIGS. 5-8, specific sizes (typically in terms of bits) are given. These specific sizes are exemplary sizes for illustration only; alternative implementations can use different sizes.

Figure 5:
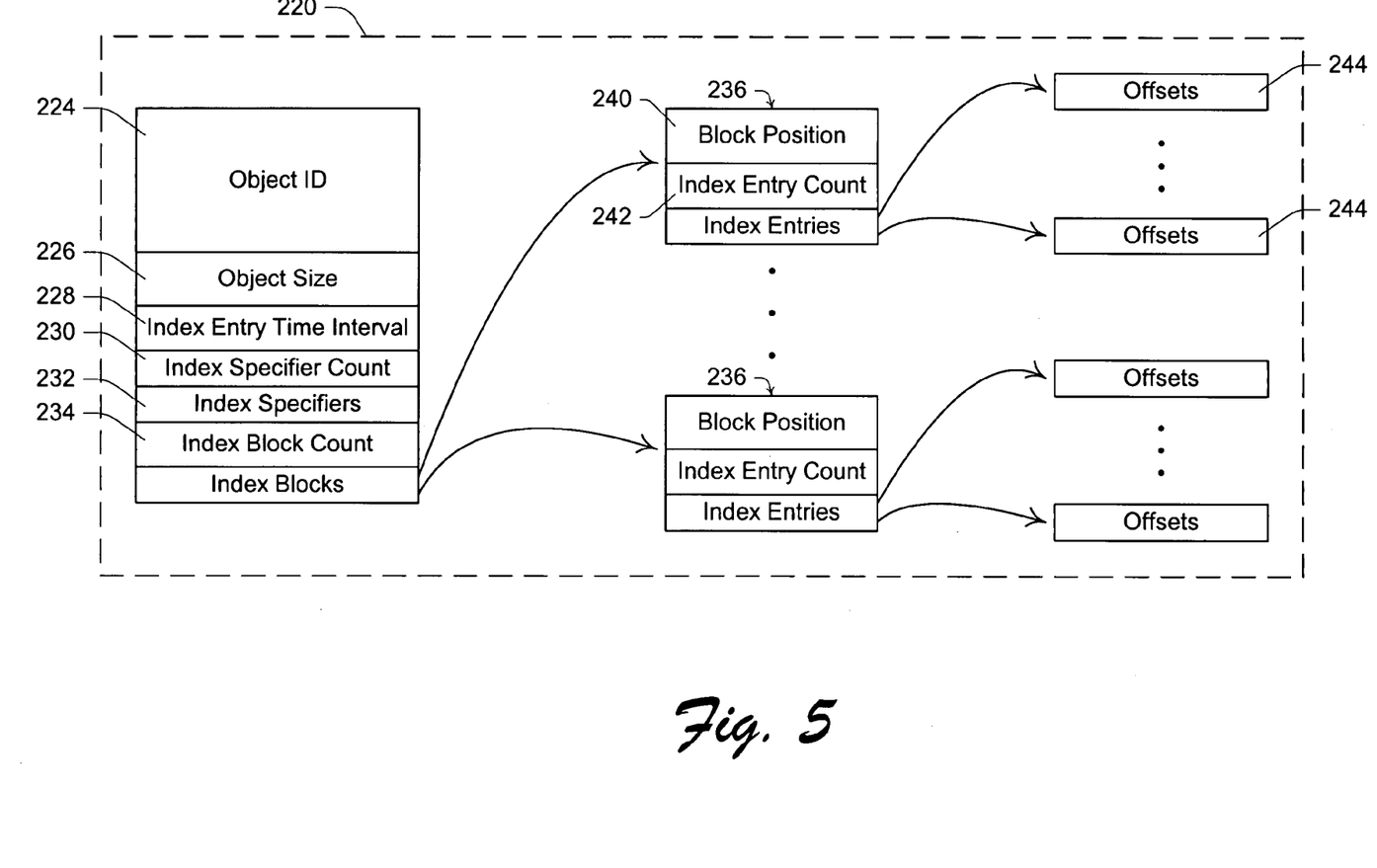
FIG. 5 illustrates an exemplary index object in accordance with one implementation of the invention.

FIG. 5 illustrates an exemplary index object 220 that is used, in conjunction with index parameters object 222 in FIG. 6 (discussed below), to create index table 208 of FIG. 4. Each set of composite media streams corresponding to the same media content (collectively referred to as an ASF file) includes one index object 1220. Index object 220 can be broken into multiple blocks to facilitate more space-efficient storage. Each block indexes into a particular range of the data stream (using a 64-bit offset), with multiple index entries for each block, each index entry indexing into a particular range of its corresponding block (using a 32-bit identifier). Index object 220 can use as many blocks as necessary, depending on the size of the corresponding composite media stream.

Index object 220 includes an object identifier 224, an object size 226, an index entry time interval 228, an index specifier count 230, an index specifiers identifier 232, an index block count 234, and one or more index blocks 236. Object identifier 224 is a 128-bit globally unique identifier that uniquely identifies object 220 as an index object rather than some other type of object. Object size 226 is a 64-bit identifier that identifies the overall size (e.g., in bytes) of index object 220.

Index entry time interval 228 is a 32-bit identifier of the granularity of each index entry. That is, index entry time interval 228 identifies a temporal range of the multimedia content that each index entry corresponds to, as discussed in more detail below.

The index specifier count 230 is a 16-bit identifier of the number of index specifier entries that exist in index specifier identifiers 232, which identifies the different index specifiers that are used in index object 220. Examples of index specifiers include: Nearest Clean Point (the closest data unit containing an entire object that has the Clean Point Flag set, identifying whether the object is a "clean point" (e.g., a video key frame)); Nearest Object (the closest data unit containing an entire object or first fragment of an object); and Nearest Data Unit (the data unit with a presentation time closest to the index entry time).

Index block count 234 is a 32-bit identifier of the number of index blocks 236 that exist in the index object 220.

Each index block 236 includes a block position identifier 240, an index entry count 242, and one or more index entries 244. The block position identifier 240 is a 64-bit block offset into the data stream.

Index entry count 242 is a 32-bit identifier of the number of index entries 244 included in block 236. Each index entry 244 corresponds to a particular data unit of the composite data stream. The temporal range (granularity) of the multimedia content that the data units correspond to can vary between ASF files (e.g., 10 millisecond or 100 millisecond samples or frames). The temporal range that the data units correspond to, and thus the range that the index entries correspond to, is identified by index entry time interval 228 discussed above.

Each index entry 244 includes one or more 32-bit offsets into the data stream. In the illustrated example, each index entry 244 includes one 32-bit offset for each of the different index specifiers in specifiers identifier 232. The 32-bit offset of an index entry 244, in combination with the block position identifier 240, identifies a byte offset into the corresponding stream that is associated with the presentation time of the index entry 244. A different index entry 244 is associated with presentation time ranges (equal to the granularity identified by interval 228).

Figure 6:
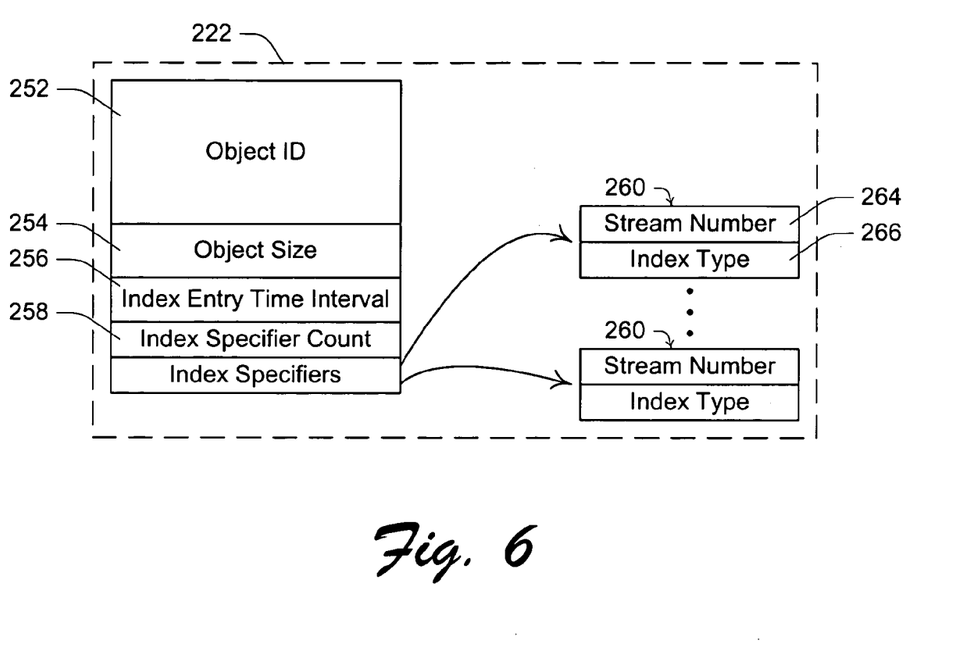
FIG. 6 illustrates an exemplary index parameters object in accordance with one implementation of the invention.

FIG. 6 illustrates an exemplary index parameters object 222 that is used in conjunction with index object 220 of FIG. 5 to create index table 208 of FIG. 4. Each ASF file includes an index parameters object 222 for each of the different timeline-altered streams in the file. Index parameters object 222 includes an object identifier 252, an object size 254, an index entry time interval 256, an index specifier count 258, and multiple index specifiers 260.

Object identifier 252 is a 128-bit globally unique identifier that uniquely identifies object 222 as an index parameter object rather than some other type of object. Object size 254 is a 64-bit identifier that identifies the overall size of index object 222. Index entry time interval 256 is a 32-bit identifier of the granularity of each index entry (analogous to index entry time interval 228 of FIG. 5). Index specifier count 258 is a 16-bit identifier of the number of index specifier entries 260 that exist in index parameters object 222.

Each index specifier entry 260 includes a stream number identifier 264 and an index type 266. Stream number identifier 264 identifies a particular composite stream in the ASF file that the specifier entry 260 corresponds to. Index type 266 identifies which index specifier type (e.g., Nearest Clean Point, Nearest Object, or Nearest Data Unit) the specifier entry 260 corresponds to.

Each index specifier entry 260 corresponds to an index entry 244 of FIG. 5. Multiple index entries 244 will be included in index object 220 each corresponding to the same presentation time of the primary stream, but corresponding to different timeline-altered streams (as identified by the corresponding index specifier entries 260). The combination of object 220 (FIG. 5) and object 222 (FIG. 6) provides a mapping from presentation time of the primary stream to corresponding byte offsets in each of the timeline-altered streams.

By way of example, the ASF file may include a primary stream that has not been timeline-altered and two secondary streams, one that has been timeline-altered with a speedup factor of 1.5× (e.g., 1.5 times faster than the primary stream), and another that has been timeline-altered with a speedup factor of 2.0× (e.g., 2 times faster than the primary stream). If the byte offset into the 1.5× secondary stream that corresponds to 30 seconds into the primary stream is desired (that is, 45 seconds into the 1.5× stream), then the index entry 244 that corresponds to the primary stream presentation time of 30 seconds and which has an index specifier entry 260 that indicates the entry 244 corresponds to the 1.5× stream is identified. The offset included in this index entry 244 is the byte offset into the 1.5× secondary stream corresponding to 30 seconds into the primary stream. Similarly, if the byte offset into the 2.0× secondary stream that corresponds to 30 seconds into the primary stream is desired (that is, 60 seconds into the 2.0× stream), then the index entry 244 that corresponds to the primary stream presentation time of 30 seconds and which has an index specifier entry 260 that indicates the entry 244 corresponds to the 2.0× stream is identified. The offset included in this index entry 244 is the byte offset into the 2.0× secondary stream corresponding to 30 seconds into the primary stream.

Figure 7:
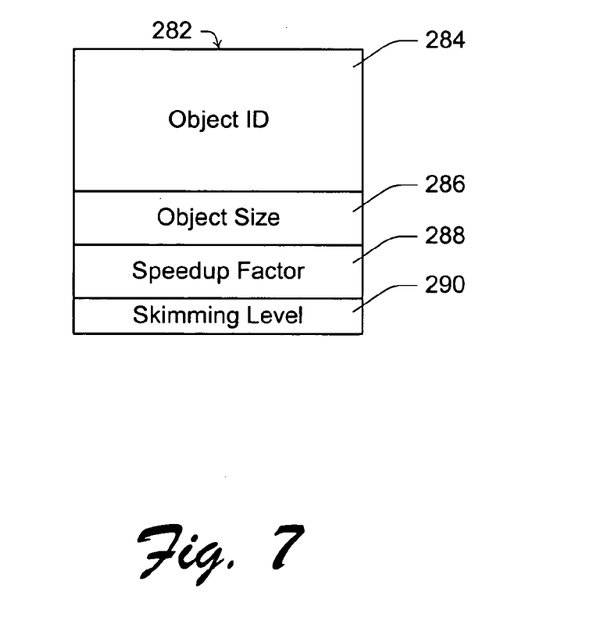
FIG. 7 illustrates an exemplary time-compressed stream properties object in accordance with one implementation of the invention.

FIG. 7 illustrates an exemplary time-compressed stream properties object 282 that is used to identify properties of a timeline-altered stream. ASF includes a stream properties object for each media stream that defines the specific properties and characteristics of the media stream. The stream properties object defines how a multimedia stream is to be interpreted as well as the specific format (of elements) of the data units for that media stream. The properties object 282 defines additional properties for timeline-altered streams, and a properties object 282 is appended to the stream properties object for each of the timeline-altered streams.

Time-compressed stream properties object 282 includes an object identifier 284, an object size 286, a speedup factor 288, and a skimming level 290. Object identifier 284 is a 128-bit globally unique identifier that uniquely identifiers object 282 as a time-compressed stream object rather than some other type of object. Object size 286 is a 64-bit identifier that identifies the overall size of object 282.

Speedup factor 288 is a 64-bit identifier of the speedup factor for the timeline-altered stream. Speedup factor 288 can identify the amount of linear timeline alteration with respect to primary stream 202 of FIG. 4 (or some other stream), or alternatively an effective speedup factor that is the result of nonlinear timeline alteration.

Skimming level 290 is a 16-bit identifier of the skimming level or priority number of the timeline-altered stream. The number of different timeline-altered streams for particular media content, as well as their relative skimming levels or priority numbers can vary in accordance with the author's or designer's wishes.

Figure 8:
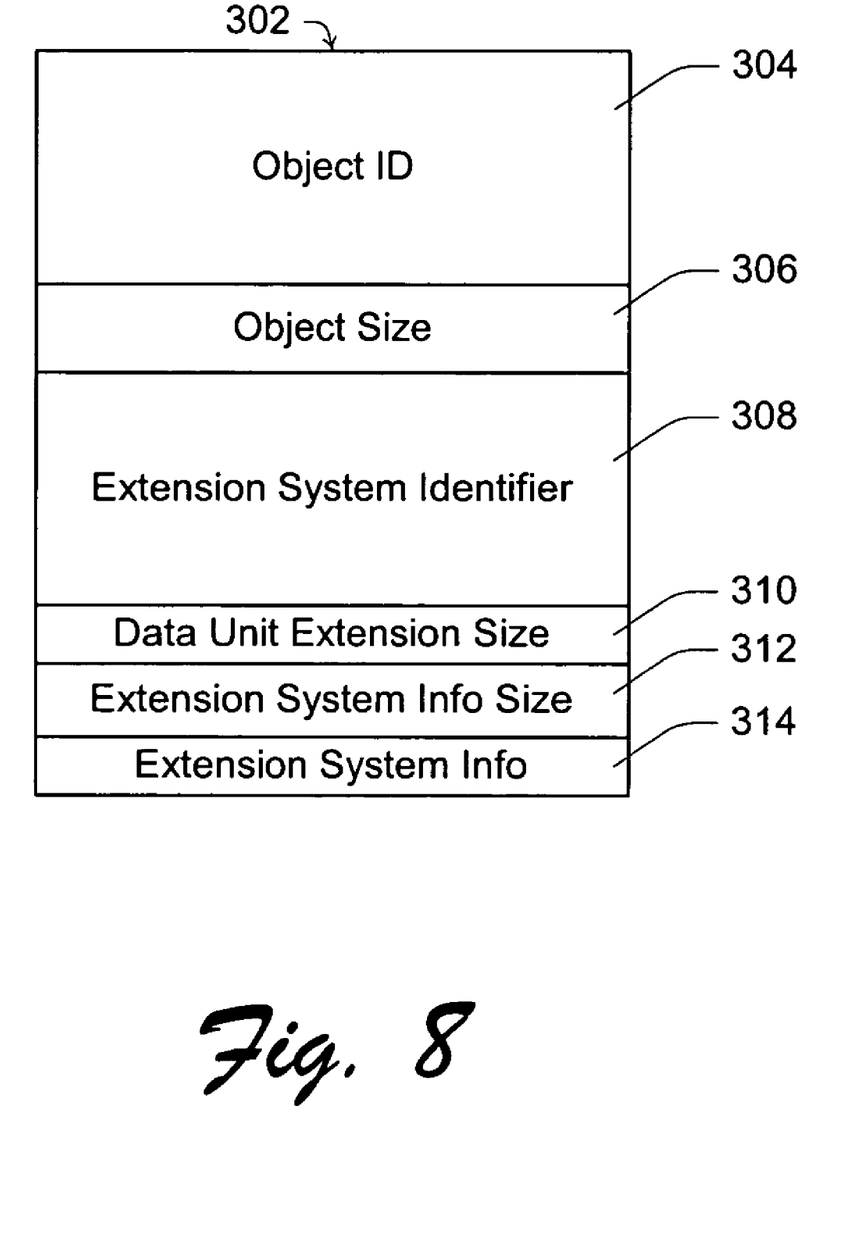
FIG. 8 illustrates an exemplary time-compressed stream data unit object in accordance with one implementation of the invention.

FIG. 8 illustrates an exemplary time-compressed stream data unit object 302. Each time code stream 210 and 212 of FIG. 4 is made up of multiple time-compressed stream data unit objects 302. In the illustrated example, the time code stream includes one object 302 corresponding to each data unit in the associated timeline-altered stream. Each data unit in the timeline-altered stream includes an "extension data" field indicating whether extension data, which is time-compressed stream data unit object 302 in the illustrated example, is included in the ASF file.

Time-compressed stream data unit object 302 includes an object identifier 304, an object size 306, an extension system identifier 308, a data unit extension size 310, an extension system information size 312, and extension system information 314. Object identifier 304 is a 128-bit globally unique identifier that uniquely identifies object 302 as a time-compressed stream data unit object rather than some other type of object. Object size 306 is a 64-bit identifier that identifies the overall size of object 302.

Extension system identifier 308 is a 128-bit globally unique identifier that identifies the type of information being stored in object 302 (which is primary stream presentation time data, as discussed in more detail below). Data unit extension size 310 is a 16-bit identifier indicating the number of bytes of extension information stored in extension system information 314. In the illustrated example, data unit extension size 310 is equal to four. Extension system information size 312 is a 16-bit identifier indicating the size (in bytes) of the extension system information field 314.

Extension system information 314 stores data identifying the presentation time (of the primary media stream) for the data unit associated with the object 302. Thus, the objects 302 provide the mapping, on a data unit by data unit basis, from the presentation time of the timeline-altered media stream to the presentation time of the primary media stream.

Figure 9:
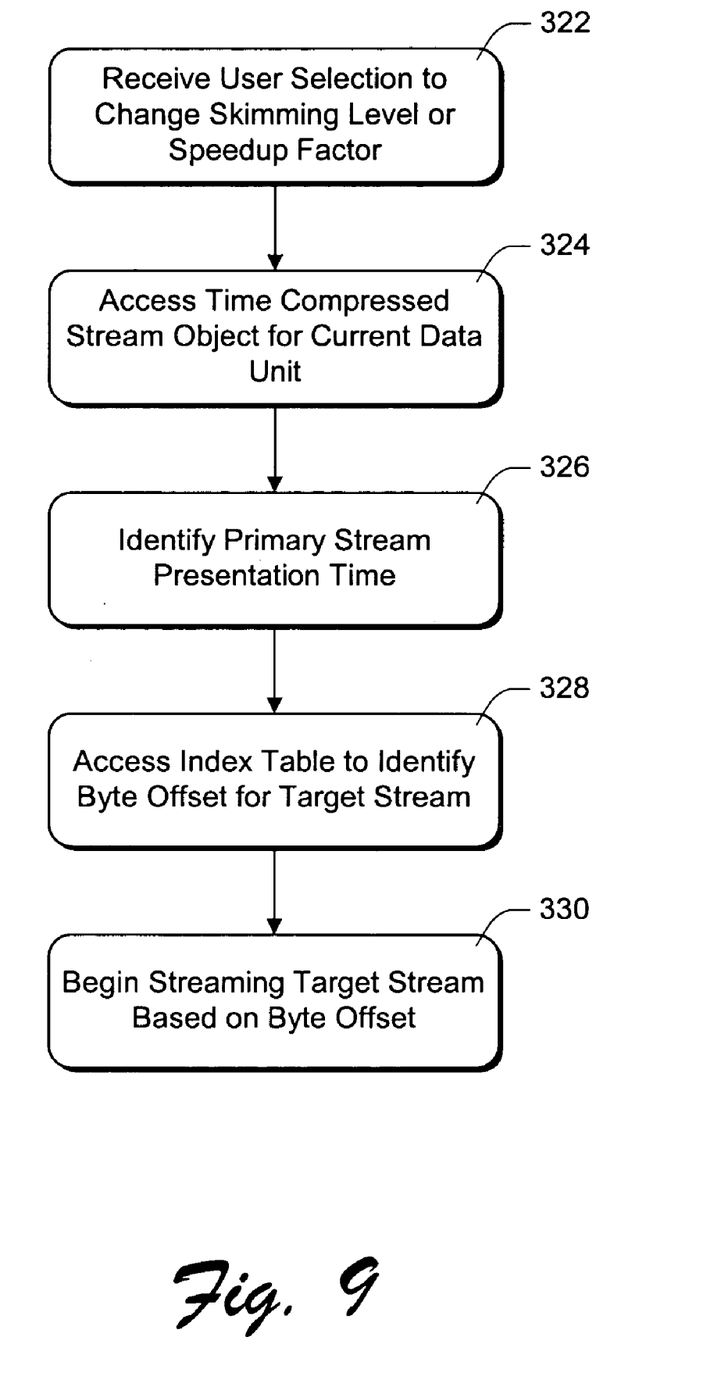
FIG. 9 is a flowchart illustrating an exemplary process for switching between presentation of two different timeline-altered streams in accordance with certain embodiments of the invention.

FIG. 9 is a flowchart illustrating an exemplary process for switching between presentation of two different timeline-altered streams in accordance with certain embodiments of the invention. The process of FIG. 9 is implemented by server 102 and/or client 104 of FIG. 1, and may be performed in software. FIG. 9 is described with additional reference to components in FIGS. 1, 4, and 7.

Initially, the client 104 of FIG. 1 that is presenting a current timeline-altered stream receives a user request to change the skimming level or speedup factor of the media content (act 322). This request is inherently a request that a new timeline-altered stream (referred to as the target stream) be streamed from server 102 to client 104 for presentation to the user. Client 104 knows, from object 282 of FIG. 7, that the current stream is a timeline-altered stream, and accesses the time compressed stream object corresponding to the "current" data unit being presented (act 324), which is the data unit being presented when the user request is received. From that time compressed stream object, client 104 identifies the primary stream presentation time corresponding to the current data unit (act 326).

Client 104 then accesses an index table 208 of FIG. 4 to identify the appropriate byte offset into the target stream (act 328). Client 104 then forwards the byte offset to server 102, in response to which server 102 begins streaming the target stream to client 104 based on the location identified by the byte offset (act 330). Server 102 may begin streaming the target stream at the location identified by the byte offset, or alternatively at a point slightly before the location identified by the byte offset.

CONCLUSION

A media file format that supports switching between multiple different timeline-altered media streams of the same media content has been described. The file format of the invention includes an index table mapping presentation times of a primary media stream to byte offsets into each of the different timeline-altered media streams, and a time code stream for each of the different timeline-altered media streams that maps presentation times of the timeline-altered media stream to presentation times of the primary media stream. These time code streams and index table advantageously allow switching between presentation of the different timeline-altered streams.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method at least partially implemented by a computer, the method comprising:
   receiving a user selection to switch from a first timeline-altered media stream to a second timeline-altered media stream;
   accessing a time-compressed stream object corresponding to a data unit, currently being rendered, of the first timeline-altered media stream;
   identifying, from the time-compressed stream object, a presentation time of a primary media stream whose timeline has not been altered, the presentation time indicates when the data unit of the first timeline-altered media stream is to be rendered, the presentation time being independent of a delivery time that indicates when the data unit is to be delivered to a rendering client;
   accessing an index table to identify an offset into the second timeline altered stream corresponding to the presentation time of the primary media stream; and
   rendering or streaming the second timeline-altered media stream beginning at the location identified by the offset to present the second timeline-altered media stream to a user.

2. The method of claim 1, further comprising rendering the second timeline-altered media stream beginning at a location prior to the location identified by the offset.

3. The method of claim 1, further comprising streaming the second timeline-altered media stream, beginning at a location prior to the location identified by the offset, to a client computer for presentation to a user.

4. The method of claim 1, wherein the time-compressed stream object maps a presentation time of the data unit to the presentation time of the primary media stream.

5. A system comprising:
   a sending computer coupled to a network;
   a receiving computer coupled to a network;
   wherein the sending computer is configured to transmit, to the receiving computer, a data stream having a plurality of data units, the data stream including a time code stream that includes, for each of the plurality of data units, a respective object that maps a current presentation time of the data unit to a corresponding current presentation time of a non-timeline altered primary data stream, the current presentation time being independent of a delivery time and indicating when the data unit is to be presented; and
   wherein the receiving computer is configured to,
      receive the data stream from the sending computer,
      receive a user request to change from presentation of the data stream to presentation of another data stream, identify a current presentation time of the other data stream based on a mapping to the non-timeline altered primary data stream in the respective object corresponding to the data unit currently being rendered; and
      render the other data stream for presentation to a user beginning at an offset into the other data stream, the offset being identified from the mapping.

6. The system of claim 5, wherein the sending computer is further configured to transmit, to the receiving computer, a media stream index having a plurality of data fields, each field including a mapping from a presentation time of the non-timeline altered primary data stream to a presentation time in a timeline-altered media stream.

7. The system of claim 6, wherein the receiving computer is further configured to identify the current presentation time of the other data stream by:

identifying the current presentation time of the non-timeline altered primary data stream from the mapping in the object corresponding to the data unit currently being rendered;

accessing the media stream index using the current presentation time of the non-timeline altered primary data stream to identify the presentation time in the timeline-altered stream.

8. The system of claim 5, wherein the data unit currently being rendered comprises the data unit being rendered at the time the user request is received.

* * * * *